Dec. 15, 1931.  C. H. WEBSTER  1,836,417
BLEEDER FOR AIR BRAKE SYSTEMS
Filed Nov. 12, 1930  2 Sheets-Sheet 1
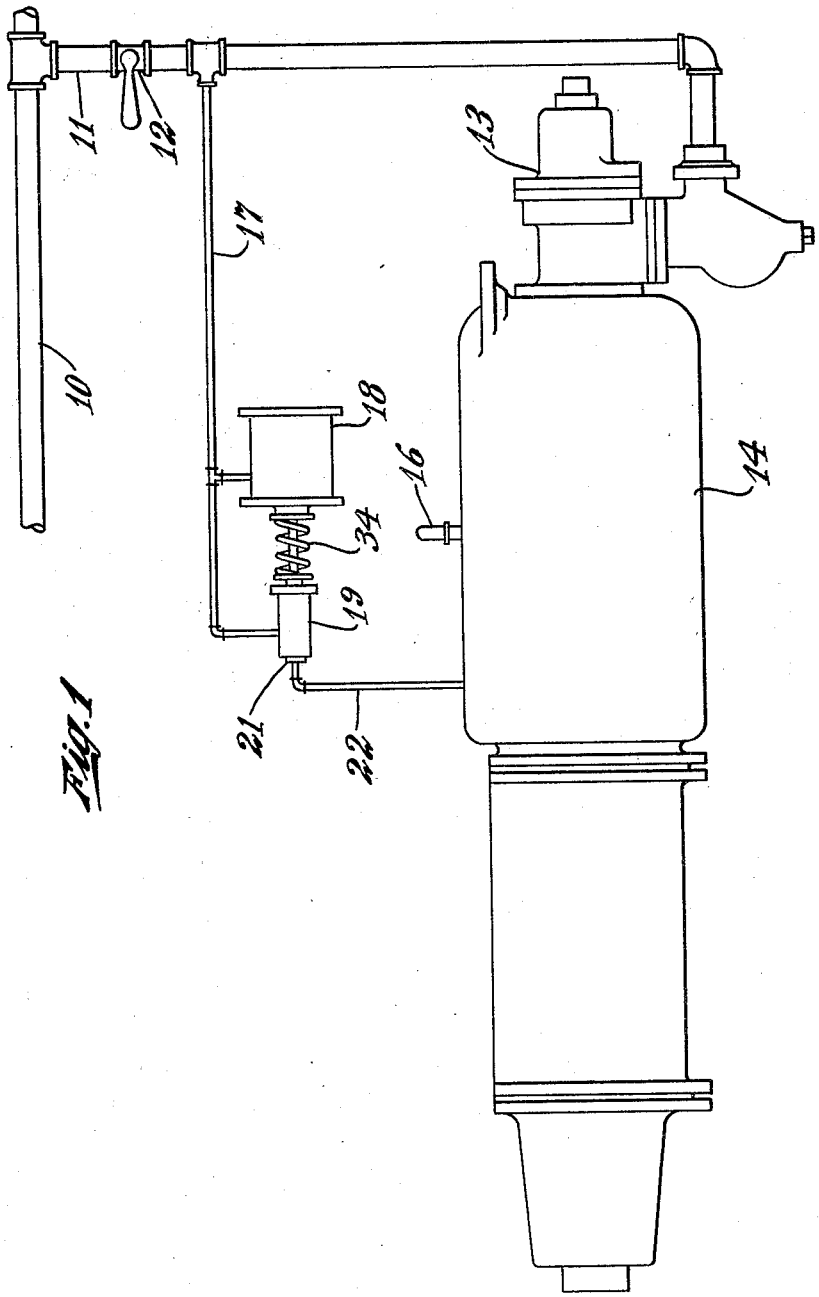
INVENTOR
*C. H. Webster*
BY
*Johnston & Jennings*
ATTORNEYS
WITNESS—
*Charles H. Bassett*

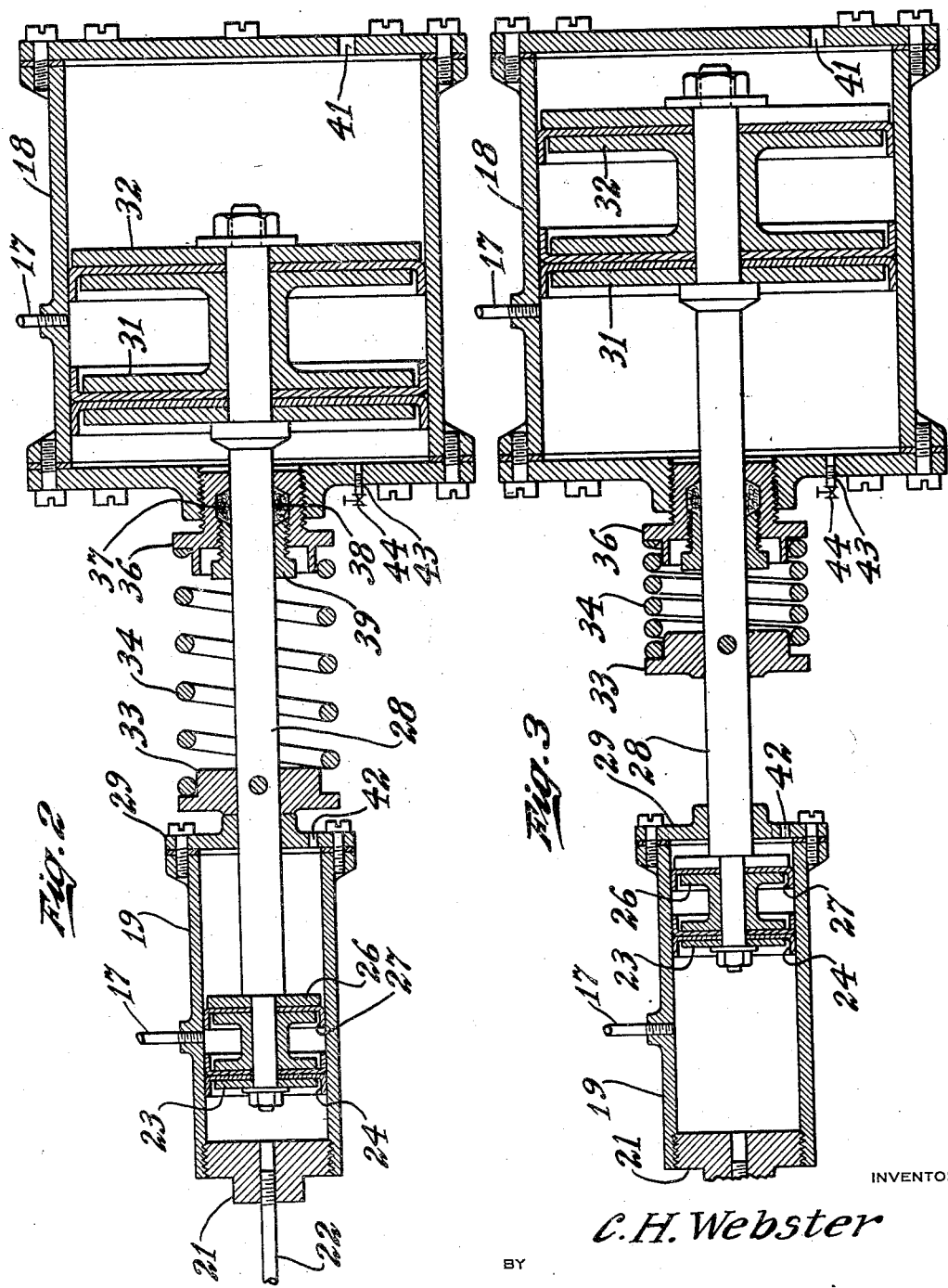

Patented Dec. 15, 1931

1,836,417

UNITED STATES PATENT OFFICE

CHARLES H. WEBSTER, OF BIRMINGHAM, ALABAMA

BLEEDER FOR AIR BRAKE SYSTEMS

Application filed November 12, 1930. Serial No. 495,201.

My invention relates to a bleeder attachment for air brake apparatus such as is commonly used on railway vehicles, especially on cars and coaches, and has for its object the provision of apparatus of the character designated which shall be simple of design, reliable in operation, and by means of which a multiplicity of cars in a train may be simultaneously drained of all the air in their respective air brake systems.

A further object of my invention is to provide a bleeder attachment for air brake systems, including a mechanism responsive to an overcharge of the system for establishing direct communication between the auxiliary reservoir on each railway vehicle and its associated brake pipe.

A still further object of my invention is to provide a bleeder apparatus for air brake systems which shall embody a by-pass arrangement between the brake pipe and the auxiliary reservoir on the railway vehicle, which by-pass is normally closed and shall be responsive to a predetermined overcharge of the system to establish direct communication, through the by-pass, between the auxiliary reservoir and the brake pipe.

As is well known in the art to which my invention relates, when the brake system is charged, each railway vehicle, by means of an auxiliary reservoir thereon, has stored up air under pressure for the application of the brake on the vehicle, which application is brought about by the well known triple valve, upon a reduction in brake pipe pressure. When the locomotive is uncoupled from a train upon its arrival at a terminal, it is necessary before the cars in the train can be shunted to "bleed", or drain, the air from the auxiliary reservoir under each car or else the brakes will set due to leakage in the brake pipe. This draining of the brake system has heretofore been accomplished by means of a bleeder valve provided on each auxiliary reservoir so that in order to drain the system it is necessary to open all the valves in a train of cars, which operation consumes a considerable period of time.

In accordance with my invention, I provide a by-pass arrangement between the brake pipe and the auxiliary reservoir on each vehicle, which by-pass is normally closed so as not to interfere with the operation of the brakes on the vehicle. Upon the attainment of predetermined pressure in the brake system, this by-pass arrangement is opened responsive to the pressure and establishes direct communication between the brake pipe and the auxiliary reservoir. By opening the brake pipe to the atmosphere, when the by-pass is in open position, all the air from the brake system escapes to the atmosphere. A dash pot is provided in each by-pass whereby it is held open for a predetermined interval of time during the draining operation, thereby preventing its closing immediately upon a predetermined reduction in brake pipe pressure.

As is well known, the standard pressure usually carried in air brake systems is 70 pounds to the square inch, this pressure being controlled by suitable governing apparatus with which the locomotive is equipped. It is also known that the engineer may if desired, increase the pressure in the system to above standard pressure. My improved apparatus is preferably designed to operate at a definite pressure above the standard pressure, say for example 80 pounds per square inch, thereby insuring that there shall be no interference with the operation of the air brakes on the train at pressures up to standard pressure.

The above and other advantages, which will become apparent, are realized by means of my invention, an embodiment of which is shown in the accompanying drawings, forming a part of this application, in which:

Fig. 1 is a plan view of the air brake system on a railway vehicle, including my improved device;

Fig. 2 is an enlarged cross sectional view of the by-pass mechanism and showing it in closed position; and Fig. 3 is a view similar to Fig. 2 showing the by-pass mechanism in open position.

Referring now to the drawings for a better understanding of my invention, I show a brake pipe 10 such as extends from one end of the train of cars to the other. Connected to the brake pipe 10 is a branch pipe 11 with the usual cut-out cock 12. The branch pipe 11 leads to the triple valve 13 through which the auxiliary reservoir 14 is charged and by means of which reservoir and triple valve the brakes on each vehicle are set in a manner well understood in the art and which needs no description here. The auxiliary reservoir 14 is provided with the usual manually operated bleeder valve 16. As so far described, the apparatus shown is standard equipment. My improved bleeder mechanism is attached to this standard equipment and will now be described.

At 17 I show a pipe connected to the branch pipe 11 between the cut-out cock 12 and the triple valve 13, which pipe 17 is connected to the side of a dash pot cylinder 18 and to the side of an operating cylinder 19. The operating cylinder 19 is connected at its outer end 21 to a conduit 22 leading to the auxiliary reservoir 14.

Referring to Figs. 2 and 3 of the drawings, the operating cylinder 19 is provided with an operating piston 23 having suitable packing means 24 to prevent leakage thereby. The conduit 17 from the branch pipe 11 connects to the side of the operating cylinder 19 behind the piston 23. In order to balance the pressure on the piston 23, so that the piston 23 will not be affected by brake pipe pressure, I provide a second piston 26 in the operating cylinder 19, the piston 26 being also provided with a suitable packing means 27. It will be noted that the conduit 17 leads into the cylinder 19 between the pistons 23 and 26, when the by-pass is in closed position, as shown in Fig. 2.

The pistons 23 and 26 are mounted on a piston rod 28 extending through the head 29 of the cylinder 19 and into the dash pot cylinder 18. The dash pot cylinder 18 is provided with two pistons 31 and 32, also mounted on the piston rod 28, and the conduit 17 leads into the dash pot cylinder 18 between these two pistons when the by-pass mechanism is in closed position.

At 33 I show a collar secured to the piston rod 28 and bearing against the collar 33 is one end of a compression spring 34. The other end of the spring 34 bears against an abutment 36 which is screwed into the end of the dash pot cylinder 18 and by means of which the compression load on the spring 34 may be adjusted. The abutment 36 is bored out to form a stuffing box 37 in which is disposed suitable packing 38, the packing being held in place by means of a stuffing box nut 39. The outer ends of both the cylinders 18 and 19 are open to the atmosphere through suitable ports 41 and 42 respectively. The left hand end of the cylinder 18, as seen in the drawings, is provided with a restricted orifice 43, controllable by a valve 44, for a purpose to be described later.

When the apparatus is installed on a vehicle, the spring 34 is adjusted by means of abutment 36 to withstand a predetermined pressure above standard pressure in the air brake system. For example, if the standard pressure is 70 pounds, the spring 34 may be set to withstand a pressure of 80 to 90 pounds per square inch in the auxiliary reservoir, which pressure is conveyed to the operating cylinder 19 by means of the conduit 22 and is at all times present in the operating cylinder 19 against the piston 23. With this arrangement, it will be seen that the by-pass mechanism is at all times closed during normal operation of the brake and cannot in any way interfere with the operation of the brakes on the train.

When, however, it is desired to drain all the air from the air brake system, the system is allowed to "overcharge", that is to build up a pressure above standard pressure sufficient to overcome the spring 34 and cause the operating piston 23 to move to the position shown in Fig. 3. When this has occurred, it will be seen from Fig. 3 that a direct communication is established between the auxiliary reservoir 14 and the branch pipe 11. If now, the brake pipe be opened to the atmosphere by any suitable means, not shown, all the air from the system is free to pass to the atmosphere from the auxiliary reservoir 14 through the pipe 22 to the cylinder 19 and from thence through the pipe 17 to the branch pipe 11 and through the brake pipe 10.

When the parts are in the position shown in Fig. 3, they are prevented from immediately returning to the closed position shown in Fig. 2 by operation of the dash pot cylinder 18. As the piston 23 moves to the right, as seen in the drawing, compressing the spring 34, it moves the pistons 31 and 32 to the right to the position shown in Fig. 3. As the pistons 31 and 32 move to the right, air is drawn into the cylinder 18 through the restricted orifice 43 until the piston 31 passes the connection in the side of the cylinder to the conduit 17. In this position, air under pressure from the brake pipe enters the left hand end of the cylinder 18 and is trapped therein, escaping to the atmosphere slowly through the restricted orifice 43. When the brake system is being drained, and as the piston 23 is moved to the left, by the spring 34, communication between the cylinder 18 and conduit 17 is cut off before the piston 23 covers the conduit 17 in the cylinder 19. The air under pressure trapped in the left hand end of the cylinder 18 prevents an immediate return of the piston 23 and the air from the entire system has sufficient time to escape from the brake system before the piston 23 moves to a position to close off communication with the conduit 17.

From the foregoing it will be apparent that I have devised an improved bleeder for air brake systems which is simple of construction, reliable in operation, and which cannot in any way interfere with the normal operation of the brakes.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In an apparatus for bleeding an air brake system, the combination with the auxiliary reservoir and brake pipe, of a by-pass between the brake pipe and the auxiliary reservoir, means for holding said by-pass closed while the brake system is charged to a pressure below a predetermined pressure, and means responsive to an overcharge of said system above said predetermined pressure for opening said by-pass.

2. In an apparatus for bleeding an air brake system, the combination with the auxiliary reservoir and brake pipe, of a by-pass between the brake pipe and the auxiliary reservoir, means for holding said by-pass closed while the brake system is charged to a pressure below a predetermined pressure, means responsive to an overcharge of said system above said predetermined pressure for opening said by-pass, and means for holding said by-pass open subsequent to an overcharge for a predetermined interval of time.

3. In an apparatus for bleeding an air brake system embodying an auxiliary reservoir and a brake pipe, the combination of a by-pass means between said auxiliary reservoir and the brake pipe, means responsive to a predetermined pressure in said auxiliary reservoir for opening said by-pass, means to establish a direct connection between the auxiliary reservoir and the brake pipe, and dash pot means for holding said by-pass open for a predetermined interval of time subsequent to said opening.

4. The combination with the auxiliary reservoir and brake pipe in an air brake system, of an operating piston subjected to auxiliary reservoir pressure and movable in response to a predetermined pressure in the auxiliary reservoir, a cylinder for the operating piston, a by-pass conduit between the brake pipe and the operating cylinder and adapted to establish communication with the auxiliary reservoir upon a predetermined movement of the operating piston responsive to auxiliary reservoir pressure, and dash pot means for holding said operating piston in a position to open the by-pass conduit for a predetermined interval of time.

5. The combination with the brake pipe and the auxiliary reservoir in an air brake system, of an operating cylinder communicating at one end with auxiliary reservoir, and at one side with the brake pipe, an operating piston in the cylinder and movable responsive to auxiliary reservoir pressure to establish communication through said cylinder between the auxiliary reservoir and the brake pipe, a spring for resisting movement of the piston responsive to auxiliary reservoir pressure until said pressure reaches a predetermined value above standard pressure for the system, and dash pot means for delaying the reverse movement of said piston after being moved responsive to auxiliary reservoir pressure.

In testimony whereof I affix my signature.

CHARLES H. WEBSTER.